United States Patent [19]

Beresniewicz

[11] Patent Number: 4,555,556

[45] Date of Patent: Nov. 26, 1985

[54] TERTIARY PERFLUORINATED COMPOUNDS AS RATE ENHANCING ADDITIVES IN PTFE DISPERSION POLYMERIZATION

[75] Inventor: Aleksander Beresniewicz, Wilmington, Del.

[73] Assignee: E. I. Du Pont de Nemours and Company, Wilmington, Del.

[21] Appl. No.: 711,054

[22] Filed: Mar. 12, 1985

[51] Int. Cl.[4] .............................................. C08F 2/24
[52] U.S. Cl. .................................... 526/212; 524/714; 524/767; 524/773; 526/214; 526/217; 526/220
[58] Field of Search ............... 526/212, 214, 217, 220; 524/714, 767, 773, 758

[56] References Cited

U.S. PATENT DOCUMENTS

| | | | |
|---|---|---|---|
| 2,559,629 | 7/1951 | Berry | 260/408 |
| 2,559,752 | 7/1951 | Berry | 260/29.6 |
| 3,391,099 | 7/1968 | Punderson | 260/29.6 |
| 3,704,285 | 11/1972 | Porter | 260/87.5 A |
| 4,025,709 | 5/1977 | Blaise et al. | 526/225 |
| 4,380,618 | 4/1983 | Khan et al. | 526/206 |
| 4,384,092 | 5/1983 | Blaise et al. | 526/225 |
| 4,482,685 | 11/1984 | Chin | 526/220 |

*Primary Examiner*—Paul R. Michl
*Attorney, Agent, or Firm*—Scott G. Hallquist

[57] ABSTRACT

An improvement is disclosed in a process for conducting PTFE dispersion polymerization, comprising use of tertiary perfluorinated compounds as rate enhancing additives.

9 Claims, No Drawings

TERTIARY PERFLUORINATED COMPOUNDS AS RATE ENHANCING ADDITIVES IN PTFE DISPERSION POLYMERIZATION

BACKGROUND OF THE INVENTION

The present invention relates generally to PTFE dispersion polymerization techniques, and particularly to a new class of rate enhancing additives for use in PTFE dispersion polymerization.

Polytetrafluoroethylene (PTFE) homopolymer and copolymers of tetrafluoroethylene (TFE) and ethylenically unsaturated comonomers can be produced in aqueous media by two distinctly different procedures. In one procedure, little or no dispersing additives, or surfactants, are added, and vigorous agitation is provided, yielding a precipitated "granular" resin. In the second procedure, a dispersing additive or surfactant is added, and mild agitation provided, to yield a colloidal suspension of small polymer particulates. The products of the two processes are employed in different applications; granular resin is fabricated into products by molding, while the resin produced by dispersion polymerization is employed in dispersion coating and paste extrusion fabrication processes.

Numerous classes of suitable surfactants for PTFE dispersion polymerization have been proposed and evaluated. Included within these classes are polyfluoroalkanoic acids and salts thereof; polyfluorosulfonic acids and salts thereof; polyfluorophosphonic acids and salts thereof; sulfuric and phosphoric esters of polyfluoroalkanols; and polyfluoroalkylamine salts. These classes of surfactants are disclosed by Berry, U.S. Pat. No. 2,559,752, among others. Other useful general references relating to PTFE dispersion polymerization processes include Punderson, U.S. Pat. No. 3,391,099; Porter, U.S. Pat. No. 3,704,285; Gangal, U.S. Pat. No. 4,186,121; and Khan, U.S. Pat. No. 4,380,681.

Of the foregoing classes of surfactants, the most widely employed are sodium and ammonium salts of perfluoromonocarboxylic acids having 6 to 10 carbon atoms, especially ammonium perfluorooctanoate.

The foregoing classes of surfactants can be structurally characterized as bifunctional compounds having regions of different polarity; specifically, each surfactant molecule comprises a hydrophobic group and a hydrophilic group. In dispersion polymerization processes, the hydrophobic group is adsorbed onto the surface of a growing particle, while the hydrophilic group remains in the aqueous phase. The hydrophilic group is hydrated in the aqueous phase and in the case of ionic surfactants, it is also ionized, imparting a charge to the particle surface. As a result of their like-charged surfaces, individual particles repel each other, preventing coagulation. When conventional surfactants are employed, the aqueous surface tension of the aqueous phase is initially low. The rate of polymerization is initially fast, but declines or moderates as surfactant is absorbed onto the surface of the increasing population of PTFE particles. This adsorption process stabilizes the polymer dispersion but results in increased surface tension relative to initial conditions, and, consequently, a reduced flux of TFE from the gas phase to the aqueous phase.

It has now been found that certain low molecular weight tertiary perfluorinated compounds are effective rate enhancing additives for use in TFE dispersion polymerization. These compounds act to reduce the surface tension of the aqueous polymerization medium throughout the polymerization process, enhancing flux of TFE gas from the gas phase to the aqueous phase. These rate enhancing agents remain in the aqueous phase throughout the polymerization process. Heretofore, increases in polymerization rates, and hence, process productivity, could be obtained only by increasing concentrations of polymerization initiator. However, this expedient provides polymer having reduced average molecular weight. Use of the rate enhancing compounds of the present invention provides significantly increased polymerization rates without adversely affecting the size of polymer chains or the morphology of the resulting dispersed polymer particles.

SUMMARY OF THE INVENTION

The present invention provides an improvement in a process for producing a colloidal dispersion of polytetrafluoroethylene homopolymer or copolymers of tetrafluoroethylene and ethylenically unsaturated comonomers by polymerizing tetrafluoroethylene and, optionally, ethylenically unsaturated comonomers, in an aqueous medium in the presence of an ionic initiator and a surfactant, the improvement comprising use as a rate enhancing additive of a compound of the formula

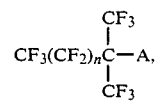

wherein
A is —OH, —COOH, —NH$_2$, or —C(O)NH$_2$; and n is 0, 1 or 2.

DETAILED DESCRIPTION OF THE INVENTION

Processes for dispersion polymerization of TFE, alone or in combination with other polymerizable ethylenically unsaturated comonomers, in aqueous media to provide colloidal particles of PTFE homopolymer and copolymers, are well known in the art. As used throughout the specification, "TFE dispersion polymerization" refers to both polymerization of TFE alone, and in combination with various suitable comonomers. Exemplary suitable comonomers include perfluoro (terminally unsaturated olefins) of 3 to 7 carbon atoms such as hexafluoropropylene, and perfluoro(alkyl vinyl ethers) of 3 to 7 carbon atoms such as perfluoro(n-propyl vinyl ether).

Generally, TFE monomer, along with comonomer if desired, is admixed or contacted with an aqueous dispersion containing a polymerization initiator and a surfactant, also referred to as a "dispersing agent." Typically, monomer is introduced into the dispersion under pressure.

Suitable conditions for TFE dispersion polymerization include polymerization temperatures ranging from 40° C. to 120° C., preferably 60° C. to 90° C.; and polymerization pressures ranging from 20 to 600 psig TFE (138 kPa to 4140 kPa), preferably 100 to 300 psig TFE (690 kPa to 2070 kPa). Polymerizations are generally carried out in a gently stirred autoclave.

Initiators employed are known PTFE polymerization initiators, examples of which include inorganic persulfates such as ammonium persulfate, alkali metal persulfates such as potassium persulfate, and organic perfluoroperoxides such as perfluoropropionyl peroxide. Initiator can be added prior to initiation of polymerization or added in increments throughout the process of polymerization. The amount of initiator employed depends upon the temperature of polymerization, the identity of the initiator, the molecular weight of the polymer desired, and the desired reaction rate. As previously noted, relatively greater concentrations of initiator increase reaction rates, but provide shorter polymer chains, which are not desirable in many applications. For use in the improved process of the present invention, initiator concentrations can be maintained from 0.0001 to 0.10 percent by weight. Preferably, initiator concentrations are maintained from about 0.005 to about 0.020 percent by weight of aqueous polymerization medium.

The dispersing agents, or surfactants, employed in the improved process of the invention can be any known polyfluorinated surfactant, for example, polyfluoroalkanoic acids and salts thereof; polyfluorosulfonic acids and salts thereof; polyfluorophosphonic acids and salts thereof; sulfuric and phosphoric esters of polyfluoroalkanols, and polyfluoroalkylamine salts. Preferably, sodium or ammonium salts of perfluoromonocarboxylic acids having 6–10 carbons are employed. The most preferred surfactant is ammonium perfluorooctanoate.

The dispersing agents or surfactants are employed in aqueous media at concentrations of 0.001 to 5 percent by weight, preferably from 0.01 to 0.3 percent by weight of medium. The process can be run in batch mode or in a continuous reactor.

The rate of enhancing additives provided by the present invention are low molecular weight tertiary perfluorinated compounds of the following formula

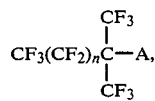

wherein

A is —OH, —COOH, —NH$_2$, or —C(O)NH$_2$; and n is 0, 1 or 2.

The rate enhancing additives are added to polymerization media at concentrations ranging from 0.1 to 5 percent by weight of medium, preferably at concentrations between about 0.2 and 1.0 percent by weight.

The tertiary perfluorinated compounds used in the improved processes of the present invention can be prepared by methods generally corresponding to those described below for synthesis of perfluoro-(2-methyl-2-butanol) and perfluoro(2-methyl-2-pentanol).

Synthesis of Perfluoro(2-methyl-2-butanol)

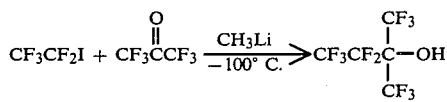

12 mL (0.11 mol) CF$_3$CF$_2$I and 10.5 mL (0.10 mol) CF$_3$C(O)CF$_3$ were condensed into a 250 mL round bottom flask containing 75 mL dry ether cooled to 100° C. using an isobutyl alcohol-liquid N$_2$ slush bath. 62.5 mL (0.10 mol) of a 1.5M CH$_3$Li solution in ether were added dropwise to the flask over a period of 55 minutes to form a reaction mixture, which was maintained at −100° C. The reaction mixture was stirred at −100° C. for an additional 30 minutes and then warmed to −10° C. before adding 50 mL 20% (W/W) H$_2$SO$_4$. The resulting organic layer was then separated, and the remaining aqueous layer was extracted with 25 mL ether. The resulting ether extract was combined with the organic layer to provide a combined organic fraction, which was dried over MgSO$_4$ and filtered, yielding a yellow-brown product solution. A sample of this solution was submitted for $^{19}$F-NMR, which indicated the presence of product perfluoro(2-methyl-2-butanol). The solution containing product was then fractionated using a Teflon ® spinning band column, yielding a series of fractions boiling between 35° C. and 89+° C. Fractions boiling between 81° C. and 89+° C. were analyzed by GC for the presence of the desired product. A fraction containing components boiling at 89° C. and above was dripped into concentrated H$_2$SO$_4$ cooled to 0°–10° C. Product perfluoro(2-methyl-2-butanol) was distilled from the concentrated H$_2$SO$_4$ solution to yield fractions boiling between 61° and 66° C. Fractions boiling above 66° C. contained essentially pure product. The remaining fractions collected during the first fractionation at temperatures from 81° C. to 89° C. were combined and redistilled to provide an additional quantity of perfluoro(2-methyl-2-butanol).

Synthesis of Perfluoro(2-methyl-2-pentanol)

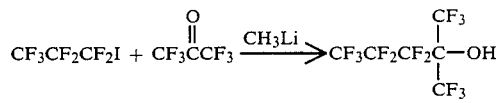

This reaction was run in a 4-necked 250 mL round bottom flask equipped with a gas inlet tube, mechanical stirrer, thermal well, and a dry-ice/acetone condenser. 10 mL (0.10 mol) CF$_3$C(O)CF$_3$ was condensed, with stirring, into a solution of 31 g (0.105 mol) CF$_3$CF$_2$CF$_2$I in 75 mL dry ether, cooled to −105° C. to −115° C. using an isobutyl alcohol/liquid N$_2$ slush bath. 1.6M CH$_3$Li in ether (62.5 mL, 0.10 mol) was added dropwise to form a reaction mixture, while maintaining the reaction temperature below −105° C. The reaction mixture was stirred for 30 minutes at this temperature before warming to −10° C. 50 mL 20% (W/W) H$_2$SO$_4$ were added dropwise to the reaction mixture, and the resulting organic layer separated. The remaining aqueous layer was extracted with 25 mL ether, and the extract was added to the organic layer previously isolated to provide a combined organic product fraction. This product fraction was dried over anhydrous MgSO$_4$, filtered, and then fractionated, using a Teflon ® spinning-band column. A colorless liquid boiling between 43° C. and 94° C. was collected and shaken with mercury to remove traces of iodine. The liquid was cooled to about 0° C. and 50 mL concentrated H$_2$SO$_4$ were added dropwise. This mixture was then fractionated again, and fractions with boiling points of 27°–35° C., 35°–50° C., 50°–59° C., 59°–75° C., and 75+° C. were collected. The fractions were analyzed by GC/MS, $^1$H-NMR, and $^{19}$F-NMR for the presence of product perfluoro(2-methyl-2-pentanol). The fraction boiling at 75° C. and above contained the desired product.

The foregoing synthesis was repeated, except that a reaction temperature of −85° C. to −80° C. was employed, and the reaction mixture was stirred for 2 hours at −80° C. prior to workup. The first distillation yielded 15 g of a colorless liquid with bp 90°–95° C., which was added to 50 mL concentrated H₂SO₄ and then distilled to provide a series of fractions boiling between 85° C. and 88° C. Those fractions boiling at about 88° C. contained 97–99% pure perfluoro(2-methyl-2-pentanol), as indicated by GC/MS and ¹⁹F-NMR.

The following examples illustrate particular aspects of the present invention. In the examples and comparisons, all parts and percentages are by weight unless otherwise indicated, and all degrees are Celsius (°C.).

EXAMPLES 1–7 AND COMPARISONS A–E

In Examples 1–7 and Comparisons A–E, which are summarized in Table I, below, PTFE polymerizations were conducted in a sealed research reactor, with stirring at 1000 rpm, at 80°. In Examples 1–7, a tertiary perfluoroalcohol was employed as a rate-enhancing additive. Comparisons A–C were conducted without addition of rate-enhancing additive, Comparison D was run without surfactant but with rate-enhancing additive, and Comparison E was run without surfactant or additive. The results obtained indicate that substantial increases in polymerization rates can be obtained when rate enhancing additives in accordance with the present invention are added to aqueous polymerization media containing conventional surfactants.

In each of the Examples and Comparisons, a 12 oz. (355 mL) stirred Paar bomb was charged with 200 mL deionized H₂O containing a quantity of surfactant (if employed) and 0.005 g potassium persulfate (K₂S₂O₈) as initiator. The test reactor was equipped with a constant speed stirrer, thermocouple, gas inlet tube for injection of TFE, pressure gauge inlet for initiator and surfactant solutions, external fitting for evacuation and charging with nitrogen, and an external silicone oil bath for heating. Following charging with water and initiator, the system was evacuated for 5 to 10 minutes, using an oil vacuum pump. The reactor was then charged with nitrogen, and the evacuation step repeated. The reactor was then recharged with nitrogen, and a selected quantity of surfactant, prepared as a concentrated solution in deionized water, was added, together with additional water to replace any lost by evaporation. The reactor was then evacuated and recharged with nitrogen an additional three times, then filled with nitrogen and disassembled if perfluoroalcohol was to be added as a rate-enhancing additive. If so, the additive was weighed into the reactor, which was then quickly reassembled. Vacuum was then applied only to a point at which the perfluoroalcohol began to boil, as indicated by formation of bubbles along the bottom surface of the reactor. At this point, TFE was added to the reaction mixture.

Following the final evacuation, or addition of additive followed by partial evacuation, TFE was admitted to the reactor, at ambient temperature, to provide a pressure of 50 psig (345 kPa). The TFE source was then cut off, and the reactor heated to 80°. At this temperature, the internal pressure of the reactor was approximately 65 psig (448 kPa). In each experiment, a drop in TFE pressure indicated initiation of polymerization. During each experiment, TFE pressure was maintained at 60 psig (414 kPa). Instantaneous rates of polymerization were determined by interrupting the TFE supply for one minute and observing the resulting drop in pressure, which is proportional to the instantaneous polymerization rate. Average polymerization rates were determined by measuring the quantity of solids produced during an experiment and are expressed in Table I, below, as grams polymer produced per liter, per hour.

Polymerization experiments were terminated when the reactor contained about 6.5 percent (plus or minus 0.5 percent) solids, by releasing TFE pressure. The contents of the reactor were then cooled to about 23°, and screened using a 400 mesh screen. Any polymer remaining on the screen or adhering to the stirrer blades was weighed separately and recorded as coagulum.

The results of Examples 1–7 and Comparisons A–E are set forth in Table I, below. In the columns indicating surfactant and additive in Table I, "A" refers to ammonium perfluorooctanoate, "B" refers to C₈F₁₇CH₂CH₂OSO₂NH₄ (Telomer B ammonium sulfonate), "C" refers to perfluoro(2-methyl-2-propanol) and "D" refers to perfluoro(2-methyl-2-butanol).

TABLE I
Examples 1–7 and Comparisons A–F
Evaluation of Polymerization Rates in Presence and Absence
of Tertiary Perfluoroalcohol PTFE Polymerization Rate Enhancing Agents

| Example or Comparison | Surfactant/ Amount (%) | Additive/ Amount (%) | Polymerization Time (min) | Avg. Rate (g/hr/L) | Max. Rate (psi/min) | Surface Tension (dynes/cm²) | Coagulum (g) |
|---|---|---|---|---|---|---|---|
| 1 | A/0.20 | C/0.25 | 39 | 117 | 5.4 | 47.5 | 0.32 |
| 2 | A/0.50 | C/0.10 | 40 | 102 | 5.2 | 46.2 | 0.1 |
| 3 | A/0.50 | C/0.25 | 40 | 122 | 6.5 | 41.5 | 0.2 |
| 4 | A/0.50 | C/0.50 | 30 | 154 | 7.8 | 40.5 | 0.2 |
| 5 | A/0.50 | C/1.00 | 27 | 159 | 11.0 | 34.8 | — |
| 6 | B/0.50 | C/0.50 | 23 | 154 | 7.0 | 44.8 | 0.11 |
| 7 | A/0.50 | D/0.50 | 30 | 128 | 7.2 | 36.6 | 0.16 |
| A | A/0.20 | none | 60 | 69 | 3.0 | 62.5 | 0.1 |
| B | A/0.50 | none | 46 | 90 | 4.2 | 52.2 | 0.1 |
| C | B/0.50 | none | 73 | 57 | 3.5 | 62.2 | 0.28 |
| D | none | C/0.50 | 23 | 50 | 3.0 | (all PTFE coagulated) |  |
| E | none | none | 21 | 50 | 3.0 | (all PTFE coagulated) |  |

What is claimed is:

1. In a process for producing a colloidal dispersion of polytetrafluoroethylene homopolymer or copolymers of tetrafluoroethylene and ethylenically unsaturated comonomers by polymerizing tetrafluoroethylene and, optionally, ethylenically unsaturated comonomers, in an aqueous medium in the presence of a suitable initiator and a surfactant, the improvement comprising use as a rate enhancing additive of a compound of the formula

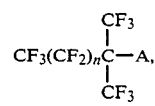

wherein

A is —OH, —COOH, —NH$_2$, or —C(O)NH$_2$; and n is 0, 1 or 2.

2. A process according to claim 1, wherein the rate enhancing additive is present at a concentration of from 0.1 to 5 percent by weight of medium.

3. A process according to claim 2, wherein the surfactant is present at a concentration of from 0.01 to 0.3 percent by weight of medium.

4. A process according to claim 3, wherein polymerization is conducted at a temperature from about 40° C. to about 120° C., and at a pressure from about 138 kPa to about 4140 kPa.

5. A process according to claim 3, wherein the rate enhancing additive is present at a concentration from about 0.2 to about 1.0 percent by weight of medium.

6. A process according to claim 5, wherein polymerization is conducted at a temperature from about 60° C. to about 90° C., and at a pressure from about 690 kPa to about 2070 kPa.

7. A process according to claim 1, wherein A is —OH.

8. A process according to claim 7, wherein n is 1.

9. A process according to claim 7, wherein n is 0.

* * * * *